United States Patent
Urwin-Wright et al.

(10) Patent No.: US 10,852,088 B2
(45) Date of Patent: Dec. 1, 2020

(54) DEVICE FOR MONITORING FIREARMS USE

(71) Applicants: Stephen David Urwin-Wright, West Sussex (GB); Lorna Patricia Urwin-Wright, West Sussex (GB)

(72) Inventors: Stephen David Urwin-Wright, West Sussex (GB); Lorna Patricia Urwin-Wright, West Sussex (GB)

(73) Assignees: Stephen David Urwin-Wright, West Sussex (GB); Lorna Patricia Urwin-Wright, West Sussex (GB)

( * ) Notice: Subject to any disclaimer, the term of this patent is extended or adjusted under 35 U.S.C. 154(b) by 15 days.

(21) Appl. No.: 16/316,565

(22) PCT Filed: Jul. 12, 2017

(86) PCT No.: PCT/GB2017/000108
§ 371 (c)(1),
(2) Date: Jan. 9, 2019

(87) PCT Pub. No.: WO2018/011537
PCT Pub. Date: Jan. 18, 2018

(65) Prior Publication Data
US 2019/0293375 A1    Sep. 26, 2019

(30) Foreign Application Priority Data

Jul. 12, 2016 (GB) .................................. 1612120.4

(51) Int. Cl.
*G01V 3/10* (2006.01)
*G01P 3/66* (2006.01)
*F41A 17/06* (2006.01)
*G01S 19/13* (2010.01)
(Continued)

(52) U.S. Cl.
CPC ............. *F41A 17/063* (2013.01); *F41A 17/08* (2013.01); *G01S 19/13* (2013.01); *G01V 3/10* (2013.01); *G06K 7/10366* (2013.01)

(58) Field of Classification Search
CPC .................................................. G06K 7/10366
See application file for complete search history.

(56) References Cited

U.S. PATENT DOCUMENTS 3,014,368 A * 12/1961 Walton ...................... G01L 5/14
                                                        73/167
3,024,453 A *  3/1962 Ransom .................... F41A 9/53
                                                        89/14.05
(Continued)

FOREIGN PATENT DOCUMENTS

WO    2012172182 A1    12/2012
WO    2014145079 A1     9/2014

OTHER PUBLICATIONS

International Search Report, PCT/GB2017/000108 dated Nov. 23, 2017, 6 pages.
(Continued)

*Primary Examiner* — John F Mortell
(74) *Attorney, Agent, or Firm* — Womble Bond Dickinson (US) LLP

(57) ABSTRACT

A device 1 for monitoring firearms use, comprising a sensing means 5, 8, 9 configured to sense firing of the weapon, and further configured to sense one or more of location and weapon orientation.

20 Claims, 8 Drawing Sheets

(51) Int. Cl.
*G06K 7/10* (2006.01)
*F41A 17/08* (2006.01)

(56) References Cited

U.S. PATENT DOCUMENTS

| | | | | |
|---|---|---|---|---|
| 3,257,905 | A * | 6/1966 | Weisman | F42D 1/04 |
| | | | | 89/1.1 |
| 4,483,190 | A * | 11/1984 | Cornett | F41A 21/32 |
| | | | | 102/209 |
| 5,005,307 | A * | 4/1991 | Horne | F41A 9/62 |
| | | | | 42/1.02 |
| 5,406,730 | A * | 4/1995 | Sayre | F41A 9/62 |
| | | | | 42/1.02 |
| 6,064,196 | A * | 5/2000 | Oberlin | G01P 3/665 |
| | | | | 324/179 |
| 6,415,542 | B1 | 7/2002 | Bates et al. | |
| 2006/0042142 | A1 | 3/2006 | Sinha | |
| 2008/0282595 | A1 | 11/2008 | Clark et al. | |
| 2010/0251586 | A1* | 10/2010 | Packer | F41A 19/01 |
| | | | | 42/1.01 |
| 2011/0025491 | A1 | 2/2011 | Cazanas et al. | |
| 2014/0182179 | A1* | 7/2014 | McHale | F41A 17/48 |
| | | | | 42/70.06 |
| 2015/0113851 | A1* | 4/2015 | Bensayan | F41A 17/063 |
| | | | | 42/117 |
| 2017/0292804 | A1* | 10/2017 | Lyren | F41A 17/066 |

OTHER PUBLICATIONS

Patents Act 1977: Search Report under Section 17, GB1612120.4 dated Nov. 29, 2017, 1 page.

* cited by examiner

DEVICE FOR MONITORING FIREARMS USE

FIELD

The present invention relates to a device for monitoring firearms use. More particularly, the present invention relates to a device that can monitor the spatial location, direction of aim, and movement of, a firearm, in order to monitor when and how the firearm is used and discharged.

BACKGROUND

The unmonitored and unaccountable use of firearms is a serious issue. There have been several recent high-profile cases in the US and the UK where conflicting information and statements have been provided after a fatal shooting. These include for example, the shootings of Jean Charles de Menezes, Mark Duggan and Azelle Rodney in the UK and Philando Castile, Alton Sterling in the US. In the US, the Cato Institute report on Police Misconduct has highlighted areas of the US where there are excessive complaints of misconduct, such as Los Angeles and Phoenix.

It is generally desirable for society that the actions of any armed individual can be fully monitored so that the individual can be held fully accountable for any actions involving their firearm, if necessary. This is particularly important if the individual is in law enforcement, and has legal authority to carry and use a weapon for law enforcement purposes.

A number of devices are known that are intended for use as firearm accessories or attachments which monitor their use and count the number of rounds fired. These devices generally use an accelerometer for detecting movement of the firearm, and to indicate whether a shot or shots have been fired. One known issue with this type of device is that they can have difficulty differentiating between a hard knock or strike, and an actual discharge where a round leaves the barrel. This can lead to a hard knock or strike being registered as a fired shot, and is a particular problem on low recoil devices. This causes a reliability issue if the captured data is forensically challenged.

A further issue is the sampling speed of accelerometers, which can limit the maximum number of rounds that can be detected per second, causing issues with correctly recording use of fully automatic firearms. Accelerometers also tend to have relatively high power consumption compared to other components on the device, and carrying the necessary power sources can adversely affect a user's ability to operate a firearm; as the duration of the operation or exercise cannot be limited to the device's battery.

A further issue is that each device of this type needs to be 'tuned' for the particular weapon that it is used with. Every round has a slightly different signature, depending on the bullet weight, amount of powder used etc, so the device needs to "know" which type of round is being fired. Therefore a unit cannot be taken off the shelf and placed on any firearm as required; the unit must first be programmed for the intended firearm and round. This makes it easy for a possible mix up to occur and for an incorrect device to be put on a gun and not register (e.g. A .50 BMG device on a .22 LR rifle would not detect anything). Modifying the device for each calibre may be a costly process, both in time and data loss.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a device for monitoring firearms use which goes some way to overcoming the abovementioned disadvantages or which at least provides the public or industry with a choice for accountability.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in an aspect the present invention may broadly be said to consist in a device for monitoring firearms use, comprising: a sensing means configured to sense firing of the weapon, and further configured to sense one or more of location and weapon orientation. This allows usage of the weapon to be accurately monitored for post-incident forensic analysis or similar.

In an embodiment, the sensing means comprises an inductive loop configured so that in use a pulse is generated within the inductive loop when an associated weapon is fired. An inductive loop allows accurate assessment of the type of shot fired without pre-calibration of the device, and is less likely to register knocks or strikes as a fired shot.

In an embodiment, the sensing means further comprises a gyroscope, configured to generate signals indicative of weapon orientation. This allows the device to track weapon usage other than fired shots.

In an embodiment, the sensing means further comprises a GPS device, configured to provide signals indicative of the location of the firearm. This allows the device to track weapon usage other than fired shots.

In an embodiment, the GPS device is further configured to provide signals indicative of the direction in which an associated firearm is pointed. This allows the device to track weapon usage other than fired shots.

In an embodiment, the GPS device is further configured to provide time and date data. This allows the device to track weapon usage other than fired shots.

In an embodiment, the device further comprises a display and control means configured to provide a visual indication of discharge of an associated weapon. This allows a user to track weapons use in real time.

In an embodiment, the display and control means comprises an LCD display. This provides a robust, readily available and inexpensive type of display.

In an embodiment, the display and control means comprises a seven-segment display. This provides a robust, readily available and inexpensive type of display.

In an embodiment, the display and control means comprises an OLED display. This provides a robust, readily available and inexpensive type of display.

In an embodiment, the display and control means is configured to indicate the number of shots fired by an associated weapon. This allows a user to track their own weapons use in real time.

In an embodiment, the display and control means is configured to indicate the number of shots remaining in the magazine of an associated weapon. This allows a user to track their own weapons use in real time.

In an embodiment, the display and control means is further configured to allow a user to adjust the display to indicate number of shots fired counting up or down, and to display the total number of shots initially available in the magazine of an associated weapon. This provides a user with customising options to their own preferences.

In an embodiment, the device further comprises a data storage and transmission module data configured to record and store data relating to use of the firearm. This assists with the provision of data for forensic analysis or similar.

In an embodiment, the data storage and transmission module is configured to receive and record a signal from the inductive loop and to store the pulse width data. This assists with the provision of data for forensic analysis or similar.

In an embodiment, the data storage and transmission module is configured to receive and record signals from the inductive loop, the gyroscope, and the GPS device. This assists with the provision of data for forensic analysis or similar.

In an embodiment, the data storage and transmission module is configured to checksum and encrypt the signal data to non-volatile memory. This assists with providing data security.

In an embodiment, the data storage and transmission module is configured for communication with external devices so that the signal data can be downloaded, and so that the device can be configured. This allows users to configure the device to their own specifications, and to download data to a remote location for storage an analysis.

In an embodiment, the data storage and transmission module is configured to record all connections, uploads and downloads to the device. This assists with providing data and device security.

In an embodiment, all data is captured, a check sum generated and the encrypted data stored on the internal persistent memory. This data can be uploaded in either real time to the server or after use to a PC. The data uploaded data is verified using keys and if invalid warnings are generated and a new database created.

In an embodiment, the data storage and transmission module further comprises a USB port. This is a common type of port and so is readily available, robust and inexpensive.

In an embodiment, the data storage and transmission module further comprises a wireless transmission means. This provides a convenient manner for connection for data transfer and configuration without the requirement for a hardwired connection.

In an embodiment, the wireless transmission means comprises one or more of Bluetooth, WiFi, or mobile communication. These are common, readily available and robust types of transmission.

In an embodiment, the further comprises a near field transceiver configured to read a mutually configured tag on an associated firearm to verify that the device is correctly connected to the firearm. This assists with the provision of device security and allows a user to easily check that the device has been correctly connected and is active.

In an embodiment, the near field transceiver comprises an RFID reader: This is a common, readily available and robust type of transceiver.

With respect to the above description then, it is to be realised that the optimum dimensional relationships for the parts of the invention, to include variations in size, weight, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which.

DETAILED DESCRIPTION

Figure 1:
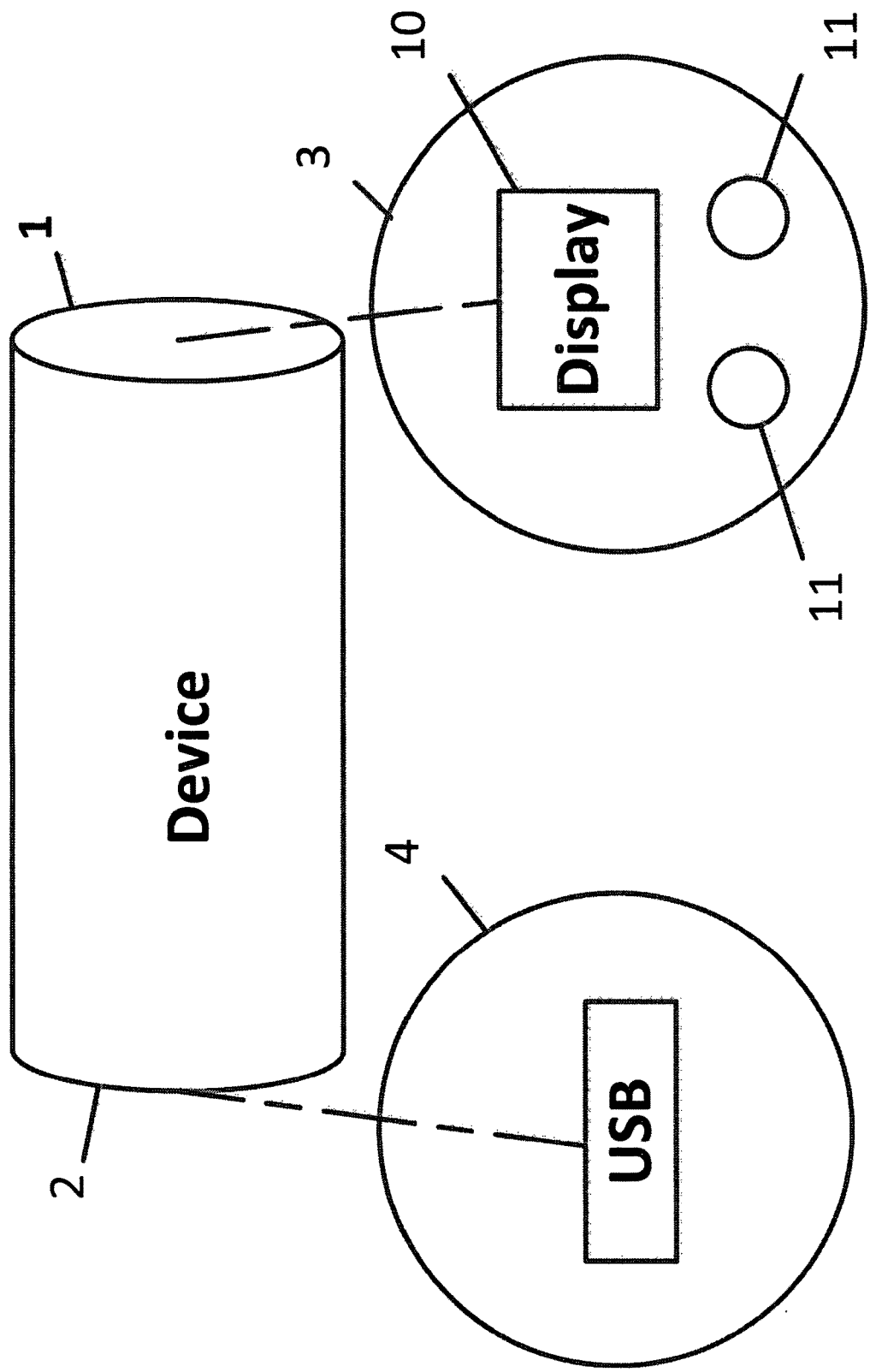
FIG. 1 shows a complete schematic view of an embodiment of the device for monitoring firearms use of the present invention, the device comprising three main separate modules, these being a sensor module, a local display and control module, and a data storage and transmission module.
Figure 2:
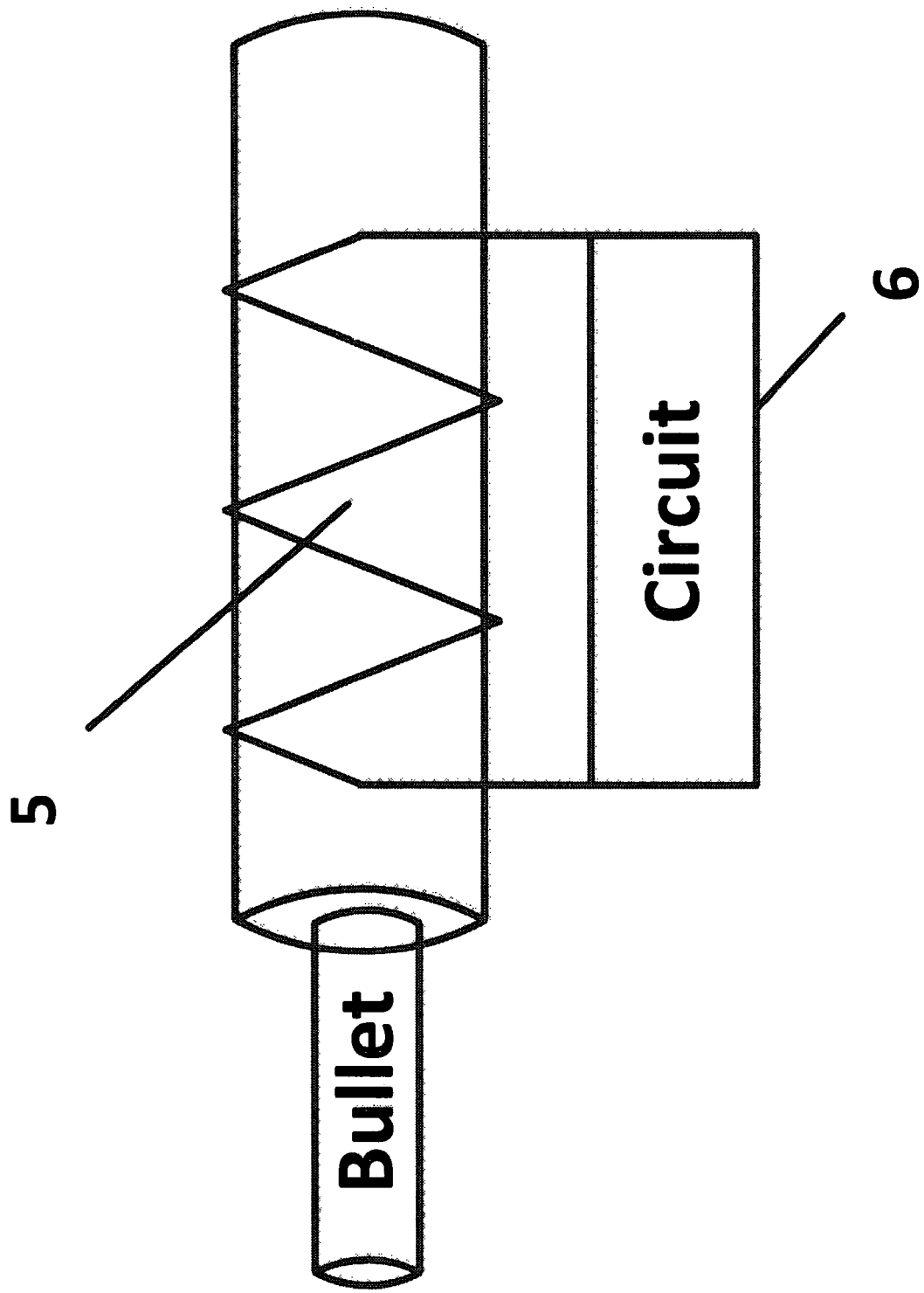
FIG. 2 shows a schematic view of the main components of the sensor module, the sensor module connected to a firearm and located ready for use, an inductive loop that forms part of the sensor module located around the barrel of the firearm so as to generate a pulse when a round is fired, the inductive loop connecting to a circuit that monitors the pulse output of the inductive loop.
Figure 3:
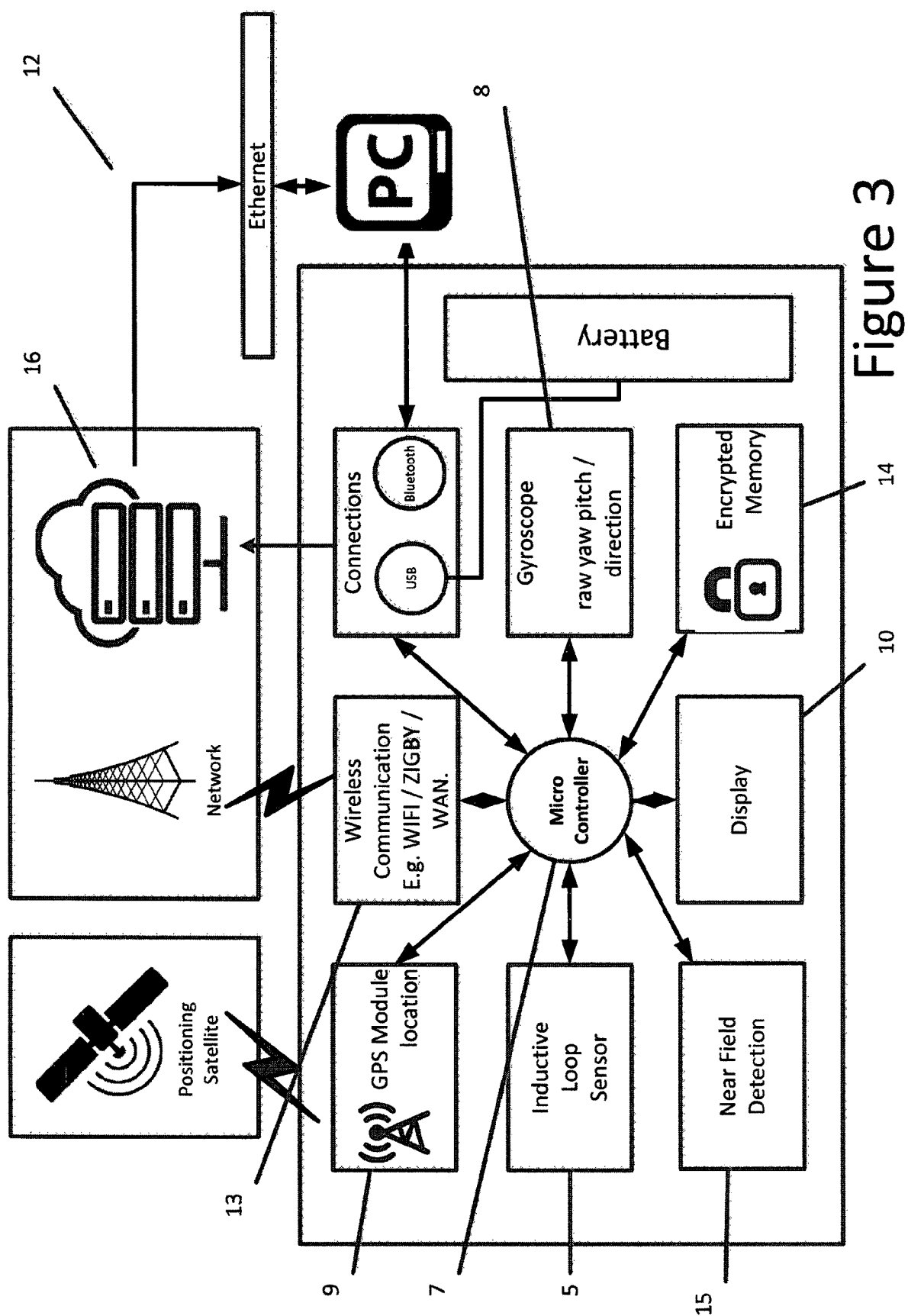
FIG. 3 shows a schematic view of the interconnection between the components of the modules of the device of the present invention, and how these communicate with external devices separate to the three main modules of the device.

An embodiment of the device for monitoring firearms use of the present invention will now be described with reference to the figures.

The main part of the device 1 is intended for mounting or attachment to a weapon in use, such as for example a rifle or handgun. The main part of the device 1 has three main modules: a sensor module 2, a display and control module 3, and a data storage and transmission module 4. These are described in detail below. The device 1 is also configured to communicate (via the data storage and transmission module 4) with an external monitoring system 12, which can be a combination of software and a PC on which the software is loaded or on which it is operating, or similar.

Sensor Module

The sensor module 2 is configured to work on a wide range of firearm calibres. The most common category of firearms is small arms (weapons with a calibre less than 100 mm). That is, the main different types of deployment hand gun, carbines and rifles. The device can also be attached to larger weapons (UN category I to VII), for example a 155 mm cannon if required, although the sensor would be mounted remotely on the side of the barrel. In the preferred embodiment described, a rifle or pistol should be taken to be the weapon referred to, unless otherwise stated. It should be noted, however, that other weapons and calibres are not excluded.

The sensor module 2 has an external casing formed so that it can be mounted at least partly around, or directly adjacent to, the barrel of the firearm. The device can be mounted to the firearm using a readily available scope mount, or similar. For small arms a scope mount can be chosen that fits the user's firearm type; popular rail types include the Picatinny (MIL-STD-1913) accessory rail, a UIT style rail, a bespoke rail or similar. For larger weapons, the device 1 can be mounted remotely to a bespoke rail and sensor 2 mounted to the side of the barrel.

An advantage of mounting the device 1 to a scope mount is that the device 1 can be rotated so that the user can easily view the device 1, for example if the device 1 has a display such as LCD display 10 of this embodiment, whether it is side mounted or mounted under the weapon. This type of mount also allows mounting on either side of the rifle, so that a left handed or right handed user can see the device.

The casing contains sensors that generate signals that indicate whether or not the gun has been fired, the spatial location of the gun, and the attitude and direction in which the gun is pointed. These are described below.

The casing contains an inductive loop 5, the casing formed around and generally conforming to the external shape and dimensions of the inductive loop 5, so that the casing is generally elongate and has a central axis that can be aligned with the gun barrel. In variations, the inductive loop can be external to the casing that contains the remainder of the device 1, and connected by a wire or wires to the remainder of the device 1. This allows the inductive loop to be mounted to the barrel of a large-calibre weapon, and for the device 1 to be remotely located away from the barrel.

The inductive loop 5 is used to detect when a bullet has been fired. When a bullet is fired, this generates a pulse within the inductive loop 5. A circuit 6 is connected to the inductive loop 5, which detects the pulse, and a signal is passed to a microcontroller 7 in the data storage and transmission module 4 so that the pulse width data is recorded. The pulse width is proportional to the ballistic characteristics of a bullet passing through or adjacent to the inductive loop 5, enabling the type of round to be determined.

Figure 4:
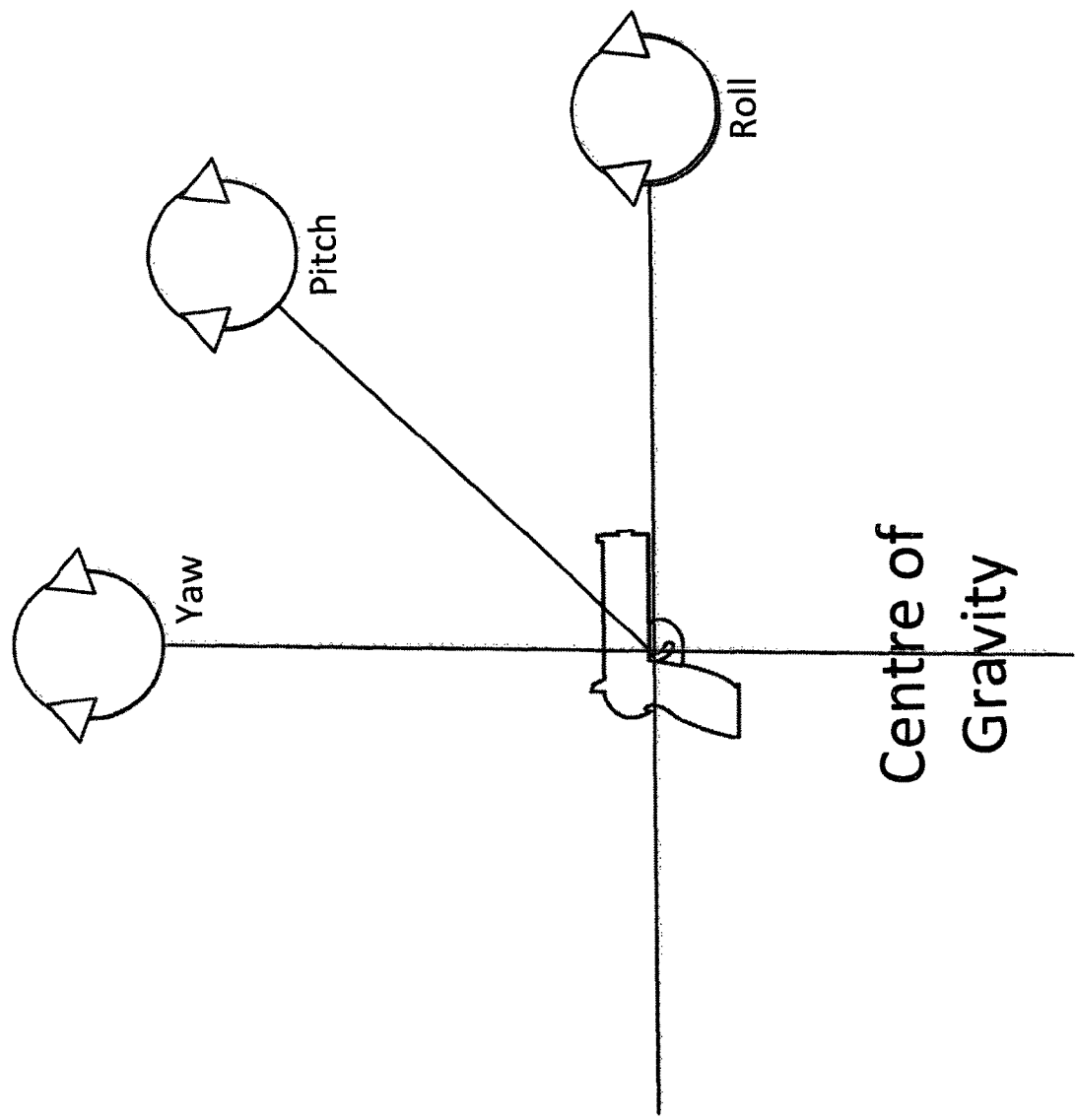
FIG. 4 shows how movement of the firearm is monitored, with yaw, roll and pitch of the barrel of the firearm measured via a gyroscope that forms part of the sensor module.

If a misfire or jam has occurred, the operator presses one of the buttons 11 to indicate this scenario. The data from the gyroscope is then recorded. This data can be used to verify that a misfire has occurred, as the gyroscope will record the tilting the rifle to remove the stuck round. A gyroscope 8 is also built into the casing. The gyroscope 8 is configured to generate signals indicative of the orientation of the firearm—the roll, yaw and pitch of the firearm. That is, the angle of the firearm in relation to rotation around a horizontally aligned front-rear axis congruent with the gun barrel (roll), the backwards/forwards angle in relation to rotation around a horizontally-aligned axis extending left-right of the gun barrel perpendicular to the barrel (pitch), and the angle of twist about an axis vertically-aligned in relation to the gun barrel (yaw). This is illustrated in FIG. 4.

A GPS sub-module 9 is also built into the casing. This is used to provide the spatial location of the firearm, and to indicate the direction in which it is pointing. The GPS sub-module can also be used to monitor time and date, as well as position and direction data. This feature would allow central command to get an early warning that a firearm has been withdrawn or discharged.

Display and Control Module

The display and control module 3 is connected to the sensor module 2. It is preferred that the display and control module 3 is either directly mounted on the sensor module 2 or is integral with the casing which contains the sensor module 2. The display and control module 3 comprises a display 10 and controls 11. The display module 10 could comprise two seven segment displays, a LCD or OLED display.

The display 10 can be configured to show the number of rounds remaining the magazine, or alternatively, the number of shots fired. Every time a shot is fired this number will count up or down. This is configured by the user either via the controls 11 or via a PC application through the USB or Bluetooth interface (described in detail below).

Other display elements can be configured as required. For example, the magazine capacity can be added to the display 10 to show how many shots of a total available have been fired or are available (e.g. 2/15, or similar). A simple visual indicator such as a red/green light for fired/not fired can also be included if desired. The colour of the number can also be configured, so that it can change as the available shots decreases. For example the user may configure the system to display in green when the magazine is full, in blue when the magazine is less than 40% and in red when the magazine is at less than 20% capacity. If this functionality in enabled, these figures can be adjusted, e.g. via the connection between the data storage and transmission module 4 and the external monitoring system 12.

However, it is preferred that the display 10 is kept simple and minimal, as other more complex data can be assessed via the external monitoring system 12.

The device can be charged via the USB connector. A battery maintenance IC is present on the device; this is able to detect a failing battery and prolong the life of the battery. During charging, the battery status is displayed on the LCD. If the device 1 is being charged during connection to the external monitoring system 12, the battery status can be recorded and reported as required.

When the device is in the sleep or monitor state (FIG. 7), a 'heartbeat signal' is transmitted. That is, the device transmits its UID and GPS positional data only back to the server 12. An indicator on the top of device can also emit a pulse to show that the device is still active. The intervals at which this data is transmitted can be configured by a user.

Data Storage and Transmission Module

The data storage and transmission module 4 allows data relating to use of the firearm to be recorded and stored, and transmitted externally to the three main modules. The data storage and transmission module 4 comprises a microcontroller 7 and a data storage sub-module 14 with an encrypted memory that records data from the inductive-loop 5, the gyroscope 8, and the data from the GPS sub-module 9. The data storage and transmission module 4 further comprises a USB port for 'hard' connection to external devices, and also comprises a wireless transmitter/receiver 13—e.g. one or more of bluetooth, WiFi, or mobile communication such as 3G or 4G. This allows the device to connect to a wireless based infrastructure (e.g. WiFi, 3G, 4G, Zigby, etc) and transmit data to a central server, enabling the data to be used instantaneously. All collected data is check summed and encrypted to non-volatile memory.

The device 1 has an internal real time clock (RTC) in the microcontroller 7. The RTC is synchronised to the UTC of the GPS module 9. If the GPS module 9 is unable to locate a signal, the device moves to an internal RTC as providing time for the device. If the GPS module is unable to provide a [x, y, z] co-ordinate, then the microcontroller 7 generates a predicted location based on a dead reckoning location from the last known GPS location. If the microcontroller predicts either the time or location, then this is denoted in the stored data 14.

In the preferred embodiment, the data storage and transmission module 4 also comprises a near field transceiver 15 that is used to facilitate armoury tracking (e.g. checking the equipment in and out) and to verify that the main part of the device 1 is correctly connected to a firearm, ready for use. In the preferred embodiment, the near-field transceiver 15 communicates with an RFID tag on the firearm, to confirm that the device has not been removed and replaced on a different firearm. Changes are recorded as error messages.

External Devices

As outlined above, data is recorded in the main part of the device 1, and can also be transmitted in real-time to external devices, such as an external monitoring system 12.

Before and after use, the data storage and transmission module 4 is connected (either via the USB connection or other hardwire connection, or by wireless connection) to an external computing device that forms part of an external monitoring system 12. This can be any correctly configured PC, or the device 1 can be configured for communication with a single PC for security purposes, to ensure that downloads are not completed to other devices. The PC or terminal can be a stand-along unit, or it can be a networked unit connected via a hard connection or an internet-type connection to a server or servers, and/or other similar terminals. When data is uploaded, a record is kept of which database the data was uploaded to and the number of entries on that database. When data is uploaded, these values are checked against stored values. If there is an issue with the integrity of the data warnings are issued.

Figure 5:
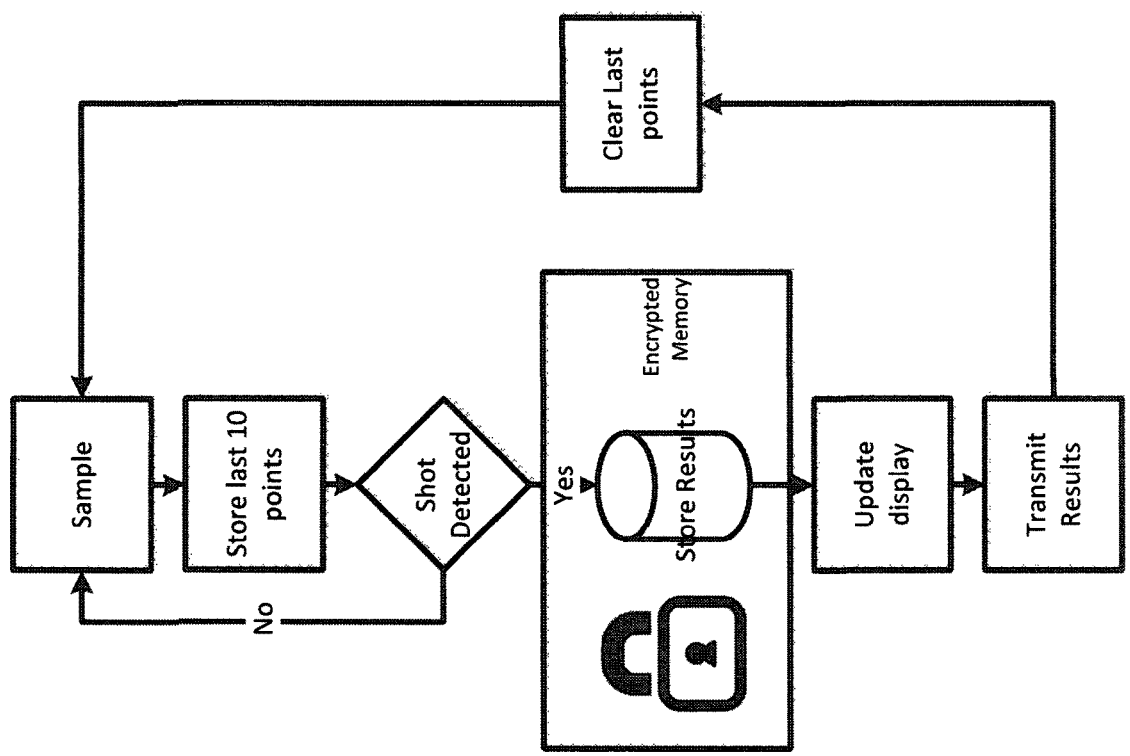
FIG. 5 shows a flowchart that illustrates how the measured data is saved, the system sampling the inductive loop ADC readings and monitoring the previous points, and showing how when a shot is detected, this data is written to non-volatile memory.

The flowchart in FIG. 5 shows how data sample points are determined. In this example ten data points are used. However, this number can be changed by connecting the data storage and transmission module 4 to the main server for configuration. Other variables that can be configured include a user (i.e. the person signing out the weapon); the size of the magazine; confirmation of data upload/download; Barrel Odometer Count (total number of rounds fired), etc.

The UTC time 9 and output the detection circuit 5 is stored in 14. The external monitoring system 12 is able to analyse the data calculate the rate of fire from the attached firearm. A calculation to accurately predict the barrel life is also determined. The external monitoring system 12 is then able to highlight barrels that require replacing.

Each device has a UID. This is set during manufacture. The external monitoring system 12 is able to verify the checksum and encryption keys when the device 1 is connected and in communication with the external monitoring system 12. When data is uploaded, keys are exchanged and the last recorded reading is compared and confirmed. These need to match for the data to be uploaded. If the keys don't match the previous uploads are signed off and a new database is created.

Use

The data collected by the modules on the device 1 shows where and how an associated firearm has been used. The data can be used in two main ways: firstly, to provide data after an incident. This may be for example a shooting or similar, the data indicating how the gun was fired, the location, the direction in which it was pointed, and how the gun was used in the immediate run-up to being fired. This can be useful for post-incident forensic analysis, and to corroborate personal witness statements and officer incident statements indicating that the weapon was drawn and that warnings were given in good time before firing.

The second way the data can be used is to provide real-time monitoring. As outlined above, data can be transmitted in real-time to external devices (via wireless transmitter/receiver 13). This real-time data can be used to highlight situations where an incident is developing or where additional help is required—for example if the data indicates that a weapon has been drawn while an officer is on patrol, or similar.

Software algorithms on server 16 can analyse the data in real time, and if this falls outside of normal parameters for walking, driving, or similar situations indicative of normal operation, an alarm can be raised, allowing support to be provided as appropriate.

Figure 6:
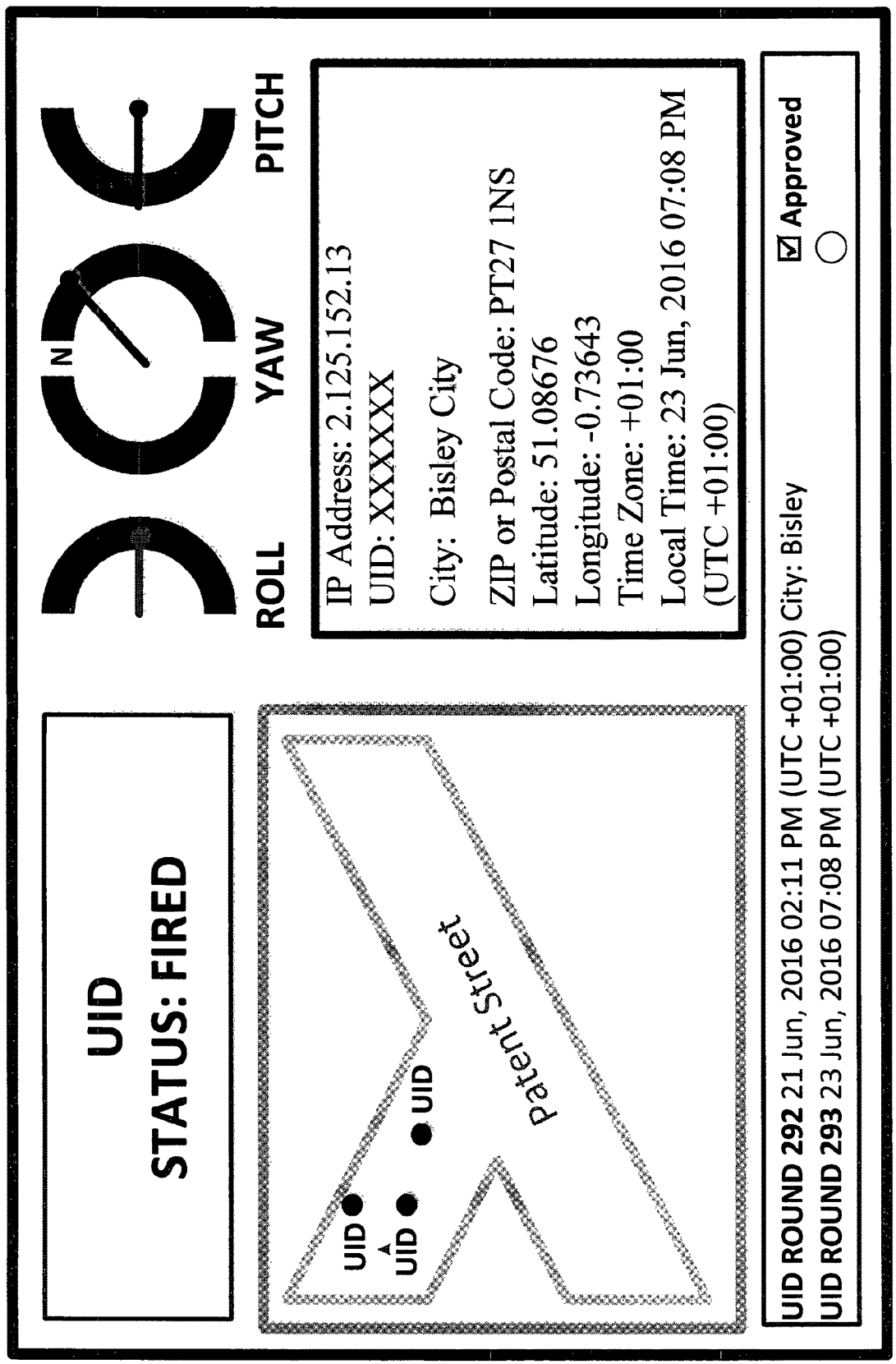
FIG. 6 shows an example display of data that can be monitored in relation to a device and associated firearm or group of devices via an external monitoring system.

For example, a number of users such as police officers or similar, can be out on patrol in an area. Their location and status can be monitored via a terminal at their home base. An example of a visual display suitable for monitoring purposes is shown in FIG. 6. The map shows three unique devices, each attached to a weapon carried by an officer, with the monitoring officer at home base able to toggle between these to bring up detailed location and use data, or to put basic data up for all three at once.

The algorithms in the software can be configured to continuously monitor the data to show the movements and status of a firearm, e.g. direction, roll, yaw and pitch of the firearm. This can be used to determine the angle of the firearm.

The software can also be configured to show other information as desired:

Location and status indicators can be colour coded to illustrate use—e.g. green indicates holstered, yellow indicating firearm drawn, and red showing that the firearm his been discharged.

Battery status of the device.

Statistics of modules, for example the percentage of memory used, firmware version or detected GPS cells.

The program can be configured to display alerts when the firearm is drawn, dropped or fired; this can be useful for monitoring more than one firearm user.

Depending on the user, the status can be configured to show whether the user is allowed to carry the firearm in their current location (based on the GPS data). A user may be allowed to carry a particular firearm while on duty, but not outside defined duty times, a user may be allowed to carry a firearm on a range, but not in a public area, and the data would indicate if the weapon is being transported, or carried/used.

The software can also provide an indication whether an officer is injured or in trouble, based on data falling outside normal or expected usage parameters:

A prediction on the life of the barrel can also be provided, based on the rate of fire and historic information relating to the barrel material.

Misfire or jam of round, when the operator has pressed the button 11.

Barrel life expectancy.

If there is a change in ownership, the ownership details can be updated.

The preferred embodiment of the device 1 is described above. Variations can be made to the device 1 as described below.

Detection

Figure 7:
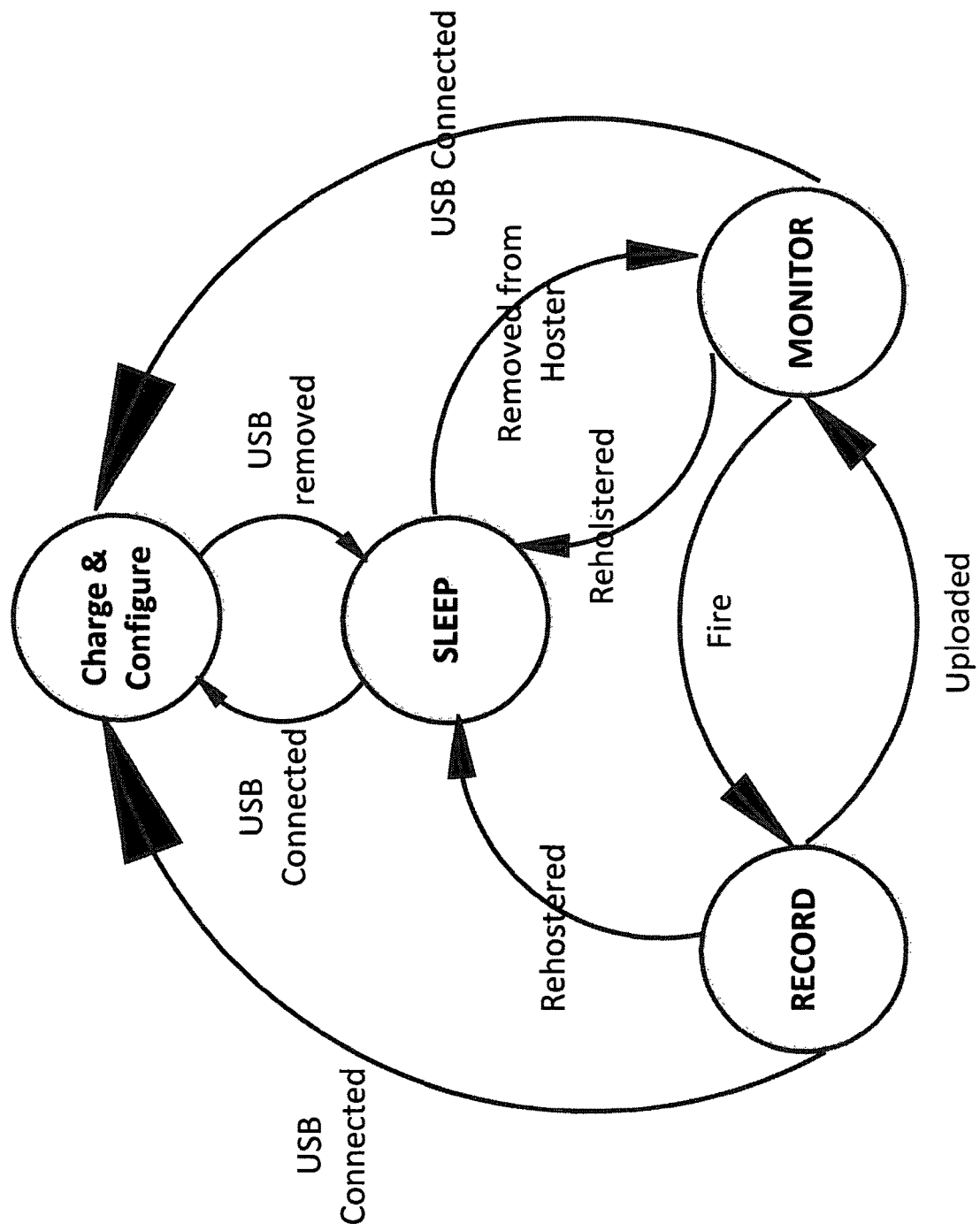
FIG. 7 shows a chart indicating the four primary states in which the device can exist, and the transition states between these.

When the device 1 is deployed on a handgun, a sensor (not shown) is used to detect when the weapon has been removed from an associated holster. This sensor can be on the holster, or can form part of the sensor module. The states detailed below are shown in FIG. 7.

If the device 1 is mounted to a handheld firearm, it enters a sleep state when the weapon is housed in the holster. When the device 1 has been removed from the holster, the device moves from the sleep state to the monitor state. When a shot is detected the device enters a record state, where the detected data is logged, encrypted, check summed, stored and transmitted. The device then enters the monitored state and only stops monitoring when it enters the sleep state when the weapon has been returned to the holster.

If the device 1 is deployed on a rifle, then this sensor can be used to detect when the weapon is in a case, and when it has been removed from the case. When the device detects that the rifle is in a case, then the device 1 enters the sleep state. When the device is removed from the case the monitor state is entered. After the rifle is removed from the case, the firearm will be constantly "on show" and the device will remain in the monitor state until either a shot is detected, the device is returned to the case of the USB is connected.

When the device 1 is in the monitor state, the display 10 can switch on when a change in orientation is detected. The duration that the device is switched on for can be configured, after this time has lapsed the display is switched off.

When the device 1 detects that the weapon has been removed (via the sensor as described above), the device records the data from the gyroscope 8 and GPS data. This data can be transmitted to the external monitoring system 12 in real time, or uploaded, as described above. The algorithms in the software can be configured to 'translate' this information so that movement of the weapon, or 'gestures' can be remotely monitored in real-time, or reviewed at a later date.

The inductive loop is used to determine when a shot has been fired, as described above. When a shot is fired, a pulse is generated that is fed into the algorithms so that the characteristics of the pulse can be analysed to ensure that the pulse is genuine and not generated by somebody attempting to trick the unit; an attempted attack is also recorded.

As the round leaves the barrel, the weapon "kicks" as the bullet leaves the barrel, and this is detected as yaw by the gyroscope 8. From the amplitude and gradient of the pulse from the inductive loop 5 and the kick data from the gyroscope 8, the calibre of the round fired can be determined. The muzzle velocity of the round can also be approximated.

A peak detection algorithm is used to analyse the data from the inductive loop 5. If a peak is detected that has certain characteristics—e.g. it has lasted for a predetermined length of time—then the algorithm will determine that a shot has been fired. This data is compared to the gyroscope data as a check. Both the gyroscope data and the inductive loop data will be within certain ranges when a shot is fired. If for example the inductive loop provides data indicative of a shot being fired, but the gyroscope data does not indicate that there has been a peak in yaw—a 'kick', then this will be flagged up as a discrepancy.

External Monitoring System

The external monitoring system 12 is configured to allow real-time monitoring of the data from a device or devices 1 connected to weapons and in use. A user or users can monitor this data using display screens or similar. The external monitoring system also allows the connection of the devices 1 for upload or download of data, for configuration of the devices 1, for charging their power cells, and similar.

An example display is shown in FIG. 6.

Figure 8:
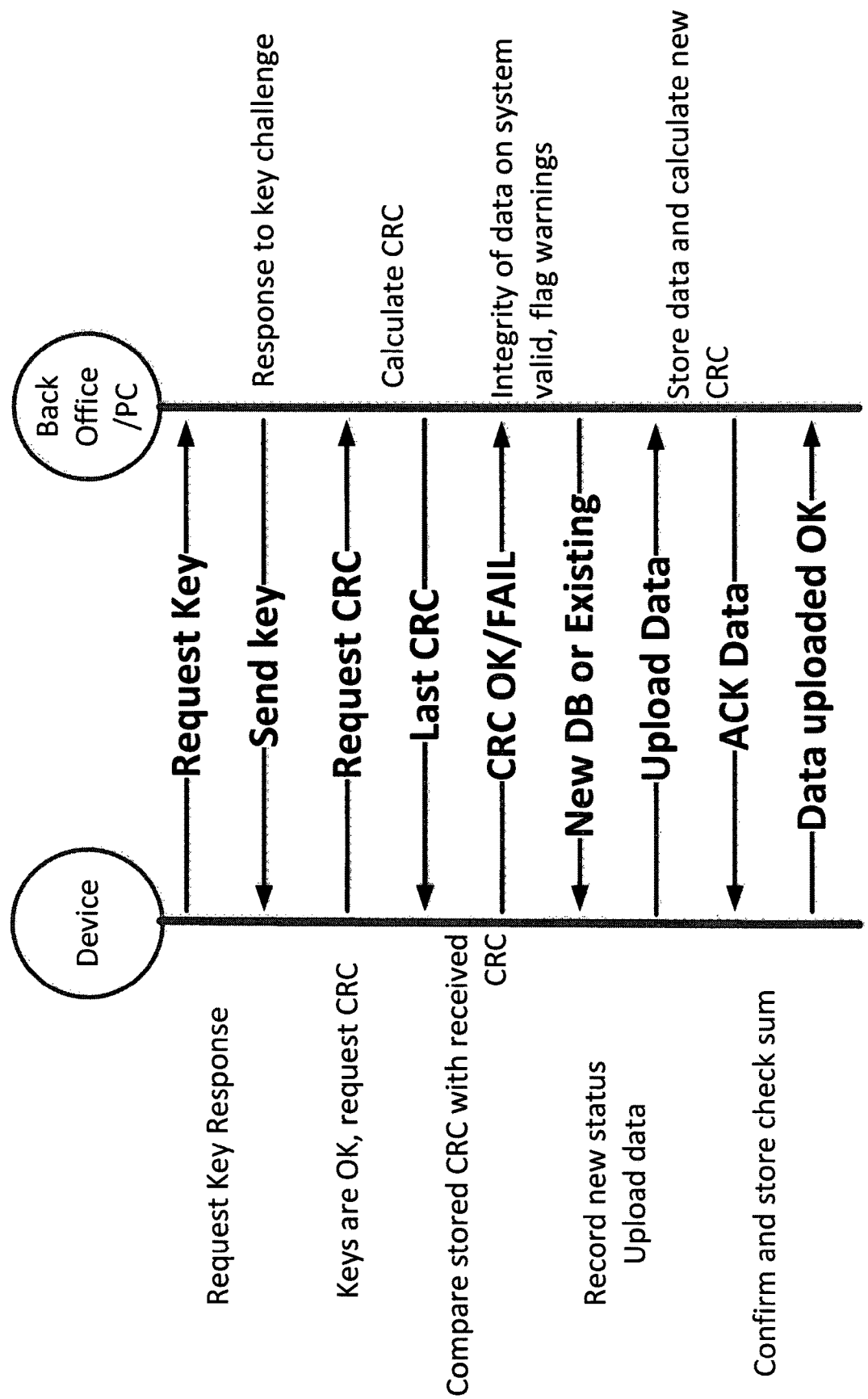
FIG. 8 shows an example of the interaction between the device of the preceding figures and an external monitoring system.

A preferred example of the interaction between the device or devices 1 and the external monitoring system 12 is shown in FIG. 8. Communication between the device(s) 1 and the external monitoring system 12 is encrypted. The device 1 starts any new connection and interaction with the external monitoring system 12 by exchanging key tokens with the external monitoring system 12 and checking the response. This will avoid the device 1 connecting to and communication with a non-authorised computer. After the keys have been confirmed, the integrity of the data is confirmed by sending the last CRC to the device 1. If there is a question of data integrity this is flagged up and a new database is created; this change is stored on the device 1. Data is then uploaded and new checksums are calculated and stored. The device 1 can be configured to upload data to a server 12, PC or both and can be configured to retain data or delete this once uploaded as required.

A geographic information system (GIS) can be incorporated in the external monitoring system 12 which is configured to capture, store, analyze, manage, and present all types of spatial, geographical and other data received from the device(s).

In a similar manner to that outlined above, the data can be loaded in either real-time or via connection to a terminal such as a PC.

As the data is encrypted and stored with a calculated checksum the user is not able to manually modify the content.

The external monitoring system is configured for secure access. The servers may be located in each country and not necessarily linked together. The external monitoring system may also provide other forms of access (internet, VPN, etc).

As outlined above, the external monitoring system can display the location and detect fire arm gestures for one or more firearms wirelessly connected to and transmitting data to the external monitoring system. The external monitoring system can analyse this information to provide indications of the use of the firearm or firearms to personnel monitoring the external monitoring system Examples of these indications include:

- An indication when the hand gun has been removed from its holster.
- An indication of gestures made with the handgun. A representation of the movement/actions of the user can be graphically represented on a display such as a computer monitor or similar that forms part of the external monitoring system 12. This could be for example a stick man shown carrying and gesturing with the device to mimic or reflect the actual gestures of the device.
- An indication of the time elapsed since the firearm was drawn. If drawn for an extended period a warning could be given.
- An indication of potentially unprofessional use of the firearm.
- The data is able to be "played back", enabling instructors to point out issues to improve future performance.
- An indication of when the user has dropped the firearm.
- An indication as to when the firearm has been withdrawn from its holster, in combination with directional and location indicators. When a user is chasing a suspect, they may not always be able to radio a status update. The fact that they have unholstered their firearm, in combination with movement at speed, is a warning indication that something is not right.
- The number of the device can be translated into user operated code, for example officer number, army ID number, code name, etc.

The chart in FIG. 7 shows the four primary states in which the device 1 can exist: charge and configure; record; monitor, and; sleep. There are a number of transitional states shown between these four primary states, such as for example when the device 1 and associated weapon are holstered, the device 1 will be in a 'sleeping' state. When removed from the holster, it will transition to a 'monitoring' state. When the device 1 is connected to the external monitoring system 12—e.g. via a workstation (and via Bluetooth or USB connection for example), it can be configured and set up to the users requirements, as shown by the 'charge and configure' state. If the USB cable is connected, the battery management controller will charge the battery and report the status. When the device is either in a holster or carry case the device is in a sleep state, and in this state it will enter low power mode, switching off communications (a "heart-beat" signal can illustrate that the device is still active and not failed, battery information, if required). When the device transitions from 'sleep' to the 'monitor' state, it can transmit data wirelessly via broadband communications and will record current values. When a shot is detected, the details are recorded to a new file.

The invention claimed is:

1. A device for monitoring firearms use, comprising a sensing means configured to sense firing of a firearm, and further configured to sense one or more of location and orientation of the firearm; and
   wherein the sensing means comprises an inductive loop configured so that in use a pulse is generated within the inductive loop when an associated firearm is fired and the inductive loop is adapted to be mounted on a side of a barrel of the associated firearm, so as to be substantially co-axial with the barrel, in use.

2. A device as claimed in claim 1 wherein the inductive loop has a central axis and the central axis is aligned with the barrel when the inductive loop is mounted on the side of the barrel, in use.

3. A device as claimed in claim 2 wherein the sensing means further comprises a gyroscope, configured to generate signals indicative of orientation of the associated firearm.

4. A device as claimed in claim 2 wherein the sensing means further comprises a GPS device, configured to provide signals indicative of the location of the associated firearm.

5. A device as claimed in claim 4 wherein the GPS device is further configured to provide signals indicative of the direction in which the associated firearm is pointed.

6. A device as claimed in claim 4 wherein the GPS device is further configured to provide time and date data.

7. A device as claimed in claim 1 further comprising a display and control module configured to provide a visual indication of discharge of the associated firearm.

8. A device as claimed in claim 7 wherein the display and control module is configured to indicate the number of shots fired by the associated firearm.

9. A device as claimed in claim 7 wherein the display and control module is configured to indicate the number of shots remaining in the magazine of the associated firearm.

10. A device as claimed in claim 7 wherein the display and control module is further configured to allow a user to adjust the display to indicate number of shots fired counting up or down, and to display the total number of shots initially available in the magazine of the associated firearm.

11. A device as claimed in claim 2 further comprising a data storage and transmission module configured to record and store data relating to use of the associated firearm.

12. A device as claimed in claim 11 wherein the data storage and transmission module is configured to receive and record a signal from the inductive loop and to store the pulse width data.

13. A device as claimed in claim 11 wherein the data storage and transmission module is configured to receive and record signals from the inductive loop, the gyroscope, and the GPS device.

14. A device as claimed in claim 11 wherein the data storage and transmission module is configured for communication with external devices so that the signal data can be downloaded, and so that the device can be configured.

15. A device as claimed in claim 14 wherein the data storage and transmission module is configured to record all connections, uploads and downloads to the device.

16. A device as claimed in claim 14 wherein the data storage and transmission module further comprises a USB port.

17. A device as claimed in claim 14 wherein the data storage and transmission module further comprises a wireless transmission means.

18. A device as claimed in claim 1 further comprising a near field transceiver configured to read a mutually configured tag on the associated firearm to verify that the device is correctly connected to the associated firearm.

19. A device as claimed in claim 18 wherein the near field transceiver comprises an RFID reader.

20. A device according to claim 1 wherein the device detects "jam removal" movements of the firearm, following the operator recording that a jam has occurred.

* * * * *